March 9, 1965   J. P. MARZENDORFER ET AL   3,172,354
SELECTIVE PRINT WHEEL AND INDICATOR
Filed Feb. 6, 1961   2 Sheets-Sheet 1
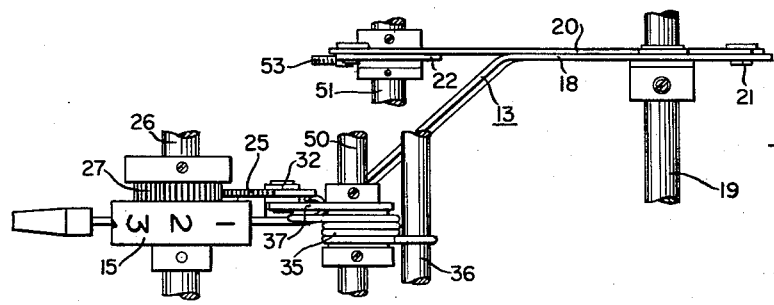
Fig. 2
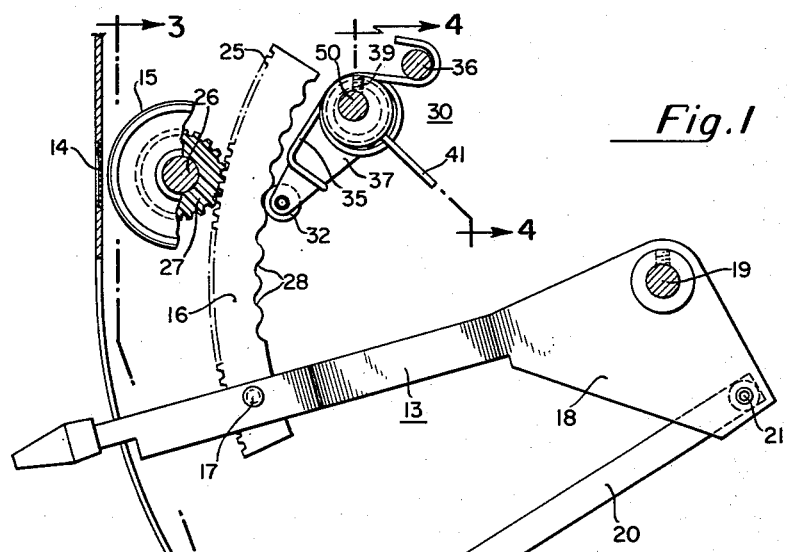
Fig. 1
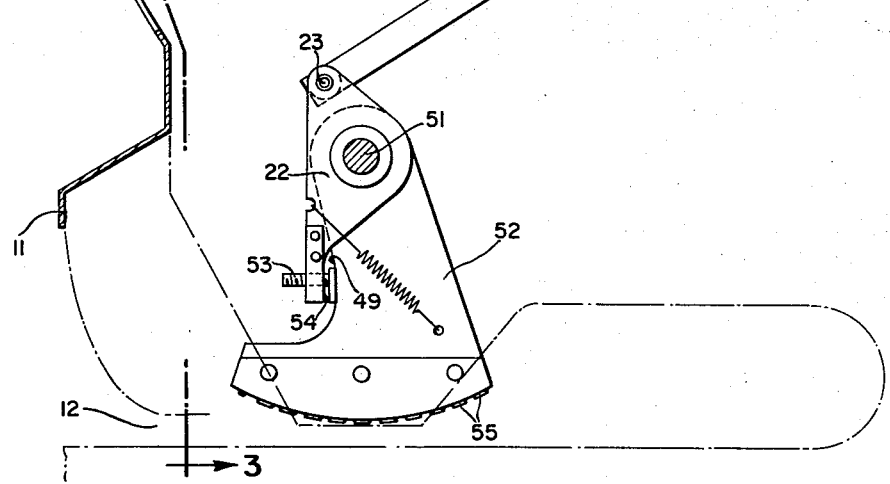
INVENTORS.
JEAN P. MARZENDORFER
RAYMOND D. RODD
BY
Nelson E. Kimmelman
ATTORNEY March 9, 1965   J. P. MARZENDORFER ETAL   3,172,354
SELECTIVE PRINT WHEEL AND INDICATOR
Filed Feb. 6, 1961   2 Sheets-Sheet 2

INVENTORS.
JEAN P. MARZENDORFER
RAYMOND D. RODD
BY
Nelson E. Kimmelman
ATTORNEY

United States Patent Office 3,172,354
Patented Mar. 9, 1965

3,172,354
SELECTIVE PRINT WHEEL AND INDICATOR
Jean P. Marzendorfer and Raymond D. Rodd, Rutland, Vt., assignors to Howe Richardson Scale Company, a corporation of Delaware
Filed Feb. 6, 1961, Ser. No. 87,134
10 Claims. (Cl. 101—95)

This invention relates to weighing apparatus and in particular to a novel arrangement for identifying a weighing transaction on a printed medium.

Weighing apparatus is known in which the weight of the material being weighed is recorded on a medium such as a printed tape or ticket. In order to identify each weighing transaction, one or more selected numbers, letters or other code symbols have frequently been printed on the recording medium in addition to the weight. In the past, identification of loads weighed was done by an operator who depressed selected keys which were arranged in banks or rows similar to those in adding machines. Such arrangements are very expensive and require a great number of parts in construction thereby increasing the chances of malfunction.

In accordance with the present invention, a novel identifier apparatus is provided which is considerably less expensive than those of the prior art and which is simpler to construct and to maintain. In general, this invention consists of one or more lever arms which are moved vertically by an operator whereupon selected identifying indicia appear in a window visible to the operator and simultaneously type corresponding to the selected number, letter or symbol is moved into position for impression upon the recording medium. An important feature of the invention is a simple adjustment for indexing the proper letter, number or symbol with the corresponding type character.

It is therefore an object of the present invention to provide a novel apparatus for selecting desired characters for imprinting upon recording media.

Another object of the invention is to provide a novel weighing transaction identifier for use with weighing and printing mechanisms.

Still another object of the invention is to provide a novel character selection mechanism which is less expensive than those hitherto employed in weight printing systems.

Another object of the invention is to provide a novel character selection mechanism for use in weight printing mechanisms which is characterized by relatively few moving parts and ease of construction and maintenance.

Other objects of the invention may be appreciated from an inspection of the drawings, specification and claims herein.

FIGURE 1 is a partially sectional side elevation view of the novel printing character selection mechanism in accordance with our invention;

FIGURE 2 is a plan view of selected portions of our novel printing character selection mechanism shown in FIG. 1.

Figure 3:
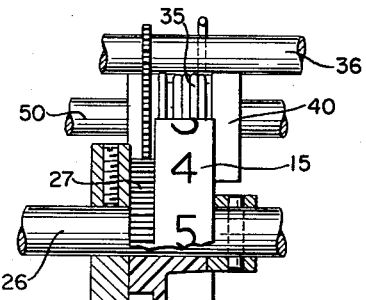
FIGURE 3 is a partially sectional front elevation view of the novel printing character selection mechanism in accordance with our invention taken along the line 3—3 of FIG. 1.
Figure 4:
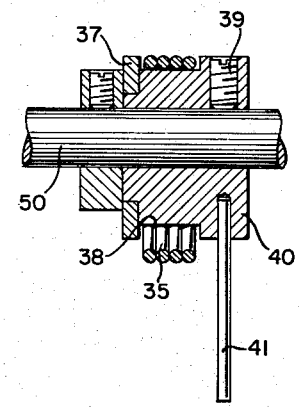
FIGURE 4 is a sectional view of the calibration mechanism taken along the line 4—4 of FIG. 1.

Referring to the various figures and especially to FIGURE 1, a housing 11 for our novel character selection apparatus is shown partially in section and partially in phantom lines. Within this housing is a mechanism for printing on tape, cards, or tickets, for example, the weight of a load being weighed. The mechanisms could be, for example, one shown in U.S. Patent No. 2,919,644 issued to C. E. Roessler, Jr., on January 5, 1960 although the weight printing mechanism is mentioned solely to illustrate a typical environment. The medium to be imprinted is inserted into the slot 12. After a load is placed upon the weighing platform of a scale (not shown) and before the recording medium is imprinted within the slot 12, the operator moves the lever arm 13 vertically until he sees through the window 14 the desired character which appears on the surface of the rotating wheel 15 (see FIGS. 2 and 3). An arcuate geared and notched member 16 is fastened to the arm 13 by means of a pivot 17. The arm 13 itself has a fulcrum portion 18 which revolves about a shaft 19, which is fastened to the housing 11. Another lever arm 20 is connected to the portion 18 by pivot 21 and also to an adjusting member 22 by another pivot 23. The adjusting member is resiliently coupled to a type sector 52 with which it pivots about a shaft 51. The sector 52 has various type characters 55 which correspond to the indicia on wheel 15.

As the operator moves the arm 13 vertically it will be seen that the arcuate member 16 moves up or down and the gear teeth 25 engage the teeth of a gear 27 which is fixedly connected to the indicator wheel 15, the gear 27 and the wheel 15 being free to rotate around shaft 26. Generally parallel to the teeth 25 of the member 16 but at the inner edge of the latter are a group of notches 28 which an adjustable detent assembly indicated generally by the numeral 30 engages.

Figure 5:
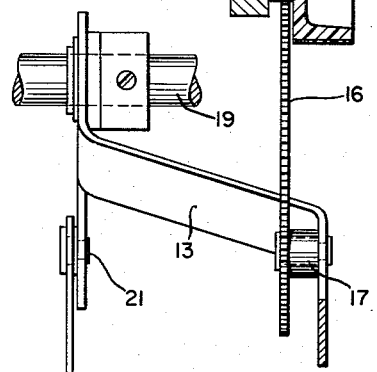
FIGURE 5 is an exploded perspective view of the calibration subassembly shown in FIGS. 1, 2 and 4.
Figure 5:
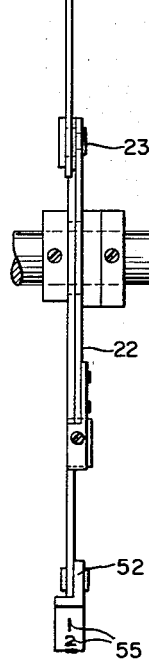
Figure 5:
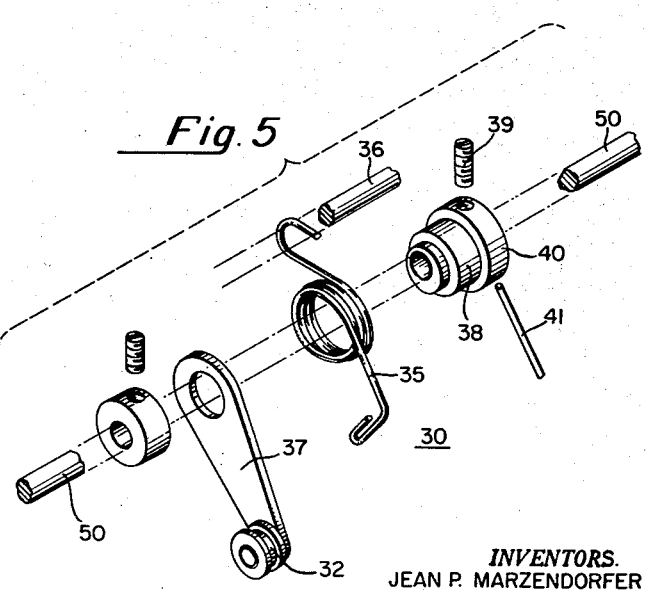

As may be seen in the detail drawings of FIGS. 2 and 5 the detent assembly 30 is constructed to urge a flanged roller pawl 32 into the notches 28 with considerable force, the pawl 32 being urged into contact therewith by means of a spring member 35 one of whose end is looped around a mooring shaft or pin 36. The other end of spring 35 is bent below the lower edge of the pawl arm 37 and up parallel to the other side thereof. The spring 35 is looped about an eccentric hub 38 which is fixedly connected to an eccentric disc-shaped member 40 from which protrudes an adjustment pin 41. The member 40 is fixedly connected to a shaft 50 by means of a set screw 39.

It will thus be seen that as the arm 13 is moved vertically by the operator the movement of the arcuate member 16 causes the gear 27 to rotate the wheel 15 until the desired character appears visible to the operator through the window 14. When the desired character appears therein, the flanged pawl 32 engages one of the notches 28 and locks the member 16 and, thereby, the gear 27 and the wheel 15 in position. At the same time, as the arm 13 is moved vertically, the linkage comprising portion 18, arm 20, and adjustment member 22 causes the type sector 52 to rotate about a shaft 51. The sector 52 is rotated until the one of the type characters 55 corresponding to the visible character on the wheel 15 appears in the printing position. To aid in making the initial adjustment of the type sector 52, there is provided an adjustment bolt 53 which determines the spacing between the edge 54 of the member 22 and the curved edge 49 of the sector 52.

Turning now to a consideration of the calibrating assembly 30, the initial correlation of the character visible through the window 14 with the appropriate one of the type characters 55 on the bottom of the type sector 52 is made as follows. The operator moves the arm 13 until it is approximately half way between the ends of the slot in the housing 11 through which it passes. The operator then gains access to the identifying mechanism by removing a top access door or panel (not shown) and pressing the arcuate member 16 backwards against the natural bias of the spring 35. While holding the member 16 in the backward position the operator can, with his other hand, move the wheel 15 until the figure "5" is visible through the window 14 whereupon the operator releases the member 16 so that the teeth 25 engage the teeth of the gear 27 and the pawl roller 32 engages one of the notches 28. Since the number "5" may not be exactly centered in the window, the operator then loosens the set screw 39 which fastens the eccentric disc member 40 and the hub 38 to the shaft 50. If the "5" appearing in window 14 is too high, the operator moves the adjustment pin 41 so that the member 40 and hub 38 can rotate about shaft 50. It will be seen that as the pin 40 is moved to its upright position the spring 35 will also be pushed up and since the later curls under pawl arm 37, arm 37 and its pawl 32 will pull up member 16 somewhat. As member 16 is pulled up it causes the gear 27 and wheel 15 to rotate in a counterclockwise direction (as seen in FIG. 1) until the figure "5" appears precisely in the center of window 14. At this juncture, the operator tightens the set screw 39 and proceeds to make an adjustment of the type sector 52. This is accomplished by turning the adjustment bolt 53 until the appropriate one of the type characters 55 is in its proper printing position.

We claim:

1. Printing character selection apparatus comprising, in combination: geared rotary means having thereon predetermined indicia, a first lever arm constructed for pivotal motion about a shaft, first coupling means coupling said lever arm and said indicia-bearing means whereby movement of said first arm causes said indicia-bearing means to rotate, said first coupling means being pivotally connected to said lever arm and having on one edge thereof a plurality of teeth constructed to mesh with the teeth of said geared rotary means, a printing means constructed and arranged to pivot about a shaft and having thereon a plurality of printing members corresponding to the indicia on said indicia-bearing means, a second lever arm pivotally connected to said first lever arm and to said printing means for causing the latter to pivot in response to movement of said first lever arm, and means for urging said first coupling means into contact with said geared rotary means thereby to cause the teeth of said first coupling means to engage the teeth of said geared rotary means.

2. The apparatus according to claim 1 wherein said urging means is also constructed to lock said first arm in selected ones of a plurality of predetermined pivotal positions.

3. The apparatus according to claim 2 wherein said urging and locking means also comprises means for making vernier positional adjustments of said geared rotary means.

4. A pawl position adjustment assembly comprising: a first essentially disc-shaped member having an eccentric aperture therein, a second essentially disc-shaped member of smaller diameter than said first member and having an eccentric aperture therein, said second member being fixedly connected to said first member so that their apertures are congruously aligned with one another, a substantially helical spring coiled about the periphery of said second member, means for constraining one end of said spring against upward movement thereof, a pawl arm connected to said second member and having an aperture therein, said last-named aperture being congruously aligned with said apertures of said first and second members, a pawl connected to said arm, said spring having its other end positioned below a lower edge of said arm thereby to urge it generally upward, and a shaft passing through all of said apertures, said first member having means for fixing the rotary position thereof with respect to said shaft, said arm being constructed and arranged to move around said shaft.

5. Apparatus of the class described comprising: a lever arm constructed and arranged for pivotal movement, means having indicia thereon and being constructed for rotary movement, first coupling means coupled to said arm and to said indicia-bearing means for imparting rotary motion to said means in response to pivotal movement of said lever arm, means for urging said first coupling means into pressing contact with said indicia-bearing means and for locking said lever arm in selected ones of a plurality of predetermined pivotal positions, printing means for printing on a predetermined medium characters corresponding to the indicia on said indicia-bearing means, said printing means being constructed and arranged for pivotal movement, and second coupling means coupled to said lever arm and to said printing means for causing pivotal movement of the latter in response to movement of said lever arm.

6. Apparatus for identifying and relatively positioning a recording device in a weighing system or the like comprising an identification station having a window, a rotatable indicator having peripherally arranged characters successively positionable to be visible through said window, a pivoted operator manipulated lever, a toothed rack pivoted adjacent one end on said lever and separably meshed with a gear rotatable with said indicator, whereby pivotal movement of said lever rotates said indicator to bring a selected character to said window, a pivoted pawl spring biased to engage said rack and urge the rack into mesh with said indicator gear, said rack being rockable about its pivot to remove it from mesh with said indicator gear for enabling said indicator to be freely turned for calibration, and said pawl rocking about its pivot during said rocking of said rack, a printing member having characters on its printing surfaces corresponding to those on said indicator rockable about a fixed pivot, and a motion transmitting link pivotally connected between said lever and said printing member.

7. In the apparatus defined in claim 6, means for adjusting said printing member about its pivotal axis to correlate the character in printing position with the character displayed at said window.

8. In the apparatus defined in claim 6, eccentric adjustment means at the pivot of said pawl acting through said pawl and rack for effecting a centering adjustment of an indicator character at said window.

9. In the apparatus defined in claim 6, said rack having a series of notches along the side opposite its teeth, and said pawl having a roller adapted to seat in a selected one of said notches.

10. The apparatus defined in claim 8 wherein means is provided for selective engagement between the pawl and rack at any of a number of different relative positions whereby the relative locations of said indicator and rack may be set before said pawl adjustment.

References Cited in the file of this patent

UNITED STATES PATENTS

| | | |
|---|---|---|
| 1,049,908 | Pannier | Jan. 7, 1913 |
| 2,103,098 | Slettevold et al. | Dec. 21, 1937 |
| 2,174,571 | Eller | Oct. 3, 1939 |
| 2,604,040 | Fenstermaker | July 22, 1952 |